United States Patent
Gross et al.

(10) Patent No.: US 7,197,411 B1
(45) Date of Patent: Mar. 27, 2007

(54) REAL-TIME POWER HARNESS

(75) Inventors: Kenny C. Gross, San Diego, CA (US); Kalyanaraman Vaidyanathan, San Diego, CA (US); Aleksey M. Urmanov, San Diego, CA (US); Keith A. Whisnant, La Jolla, CA (US); Steven F. Zwinger, Poway, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/195,014

(22) Filed: Aug. 2, 2005

(51) Int. Cl.
*G06F 1/20* (2006.01)

(52) U.S. Cl. .......................... 702/60; 702/61; 324/74; 709/220; 713/300; 713/340

(58) Field of Classification Search .................. 702/61, 702/60, 62; 324/74; 705/26, 27, 14; 709/220; 713/300, 320, 322, 323, 324, 340
See application file for complete search history.

(56) References Cited

U.S. PATENT DOCUMENTS

| | | | | |
|---|---|---|---|---|
| 4,935,642 A | * | 6/1990 | Obelode et al. | 307/32 |
| 4,937,763 A | | 6/1990 | Mott | 364/550 |
| 5,812,112 A | * | 9/1998 | Helfferich | 345/440.1 |
| 6,948,082 B2 | * | 9/2005 | Gschwind et al. | 713/320 |
| 2005/0049729 A1 | * | 3/2005 | Culbert et al. | 700/50 |

* cited by examiner

*Primary Examiner*—John Barlow
*Assistant Examiner*—Hien Vo
(74) *Attorney, Agent, or Firm*—Park, Vaughan & Fleming LLP; Gilbert C. Wong

(57) ABSTRACT

A system that generates a dynamic trace of power consumption in a computer system. The system periodically polls current sensors and associated voltage sensors within the computer system to generate dynamic traces of currents and associated voltages for individual components within the computer system. The system then generates a dynamic trace of total power consumption for the computer system based on the dynamic traces of the currents and the associated voltages for the constituent components.

18 Claims, 2 Drawing Sheets

REAL-TIME POWER HARNESS

BACKGROUND

1. Field of the Invention

The present invention relates to techniques for determining power consumption in a computer system. More specifically, the present invention relates to a method and apparatus for generating a dynamic trace of power consumption for a computer system.

2. Related Art

Large businesses often maintain datacenters containing dozens or even hundreds of servers that provide various computational services. Since excessive heat can cause premature failure of components within servers, providing sufficient cooling capacity to remove the heat generated by these servers is a primary concern for managers of these datacenters.

At the present moment, large datacenters typically over-provision cooling capacity. More specifically, large datacenters provision cooling capacity by adding up the faceplate power ratings for each server in the datacenter and then providing sufficient cooling capacity to meet this estimated maximum level of power consumption. Typically, the faceplate power rating is higher than it is possible to achieve because the faceplate power ratings are extremely conservative estimates of the maximum theoretically possible power consumption of the individual components and the field-replaceable units (FRUs) within a server.

Note that the faceplate power rating is typically determined by adding up the power rating of each individual component and each FRU within the server. Therefore, the conservatively-high power rating estimates for these individual components and FRUs are reflected in the faceplate power rating.

Furthermore, average server utilization factors are low. As a result, datacenters are being designed to provide an amount of cooling capacity that matches a maximum theoretically possible power consumption, even though the actual cooling requirements may never exceed half of this maximum cooling capacity. Thus, it is desirable to more accurately measure the dynamic power consumption of servers to prevent needless and expensive over-provisioning of cooling systems for the servers.

One technique for measuring the dynamic power consumption of a server is to place a hardware power monitor between an external power supply and the server. Unfortunately, a hardware power monitor is expensive, typically costing many thousands of dollars. Furthermore, a hardware power monitor only measures the total power entering the server and hence cannot report on the power consumption of the individual components within the server.

Hence, what is needed is a method and an apparatus for generating a dynamic trace of power consumption in a computer system without the problems described above.

SUMMARY

One embodiment of the present invention provides a system that generates a dynamic trace of power consumption for a computer system. The system periodically polls current sensors and associated voltage sensors within the computer system to generate dynamic traces of currents and associated voltages for individual components within the computer system. The system then generates a dynamic trace of total power consumption for the computer system based on the dynamic traces of the currents and the associated voltages for the constituent components.

In a variation on this embodiment, to generate the dynamic trace for total power consumption, the system first multiplies currents and associated voltages for the individual components within the computer system to produce dynamic traces of power consumption for the individual components. The system then aggregates the dynamic traces of power consumption for the individual components to produce the dynamic trace of total power consumption for the computer system.

In a variation on this embodiment, while aggregating the dynamic traces, the system applies a calibration factor to the aggregated dynamic traces to produce the dynamic trace of total power consumption for the computer system.

In a further variation, this calibration factor is determined by calibrating an estimated power consumption computed from dynamic traces of currents and associated voltages with a power consumption directly measured using an external hardware power monitor. Note that after the calibration factor is determined for a given class of computer systems, the calibration factor can be applied to any computer system in the given class without having to determine the calibration factor again.

In a variation on this embodiment, the individual components are power supplies within the computer system.

In a variation on this embodiment, the current sensors and the associated voltage sensors are polled through a telemetry harness which measures sensor variables throughout the computer system.

In a variation on this embodiment, the system uses historical sensor data to generate a trace of historical power consumption for the computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Power Harness

The present invention continuously monitors a variety of instrumentation signals in real-time during operation of a computer system. (Note that although we refer to a single computer system in this disclosure, the present invention also applies to a collection of computer systems).

These instrumentation signals can include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

These instrumentation signals can also include signals associated with canary performance parameters for synthetic user transactions, which are periodically generated for the purpose of measuring quality of service from the end user's perspective.

These instrumentation signals can additionally include "physical parameters," such as distributed internal temperatures, environmental variables, currents, and voltages.

Figure 1:
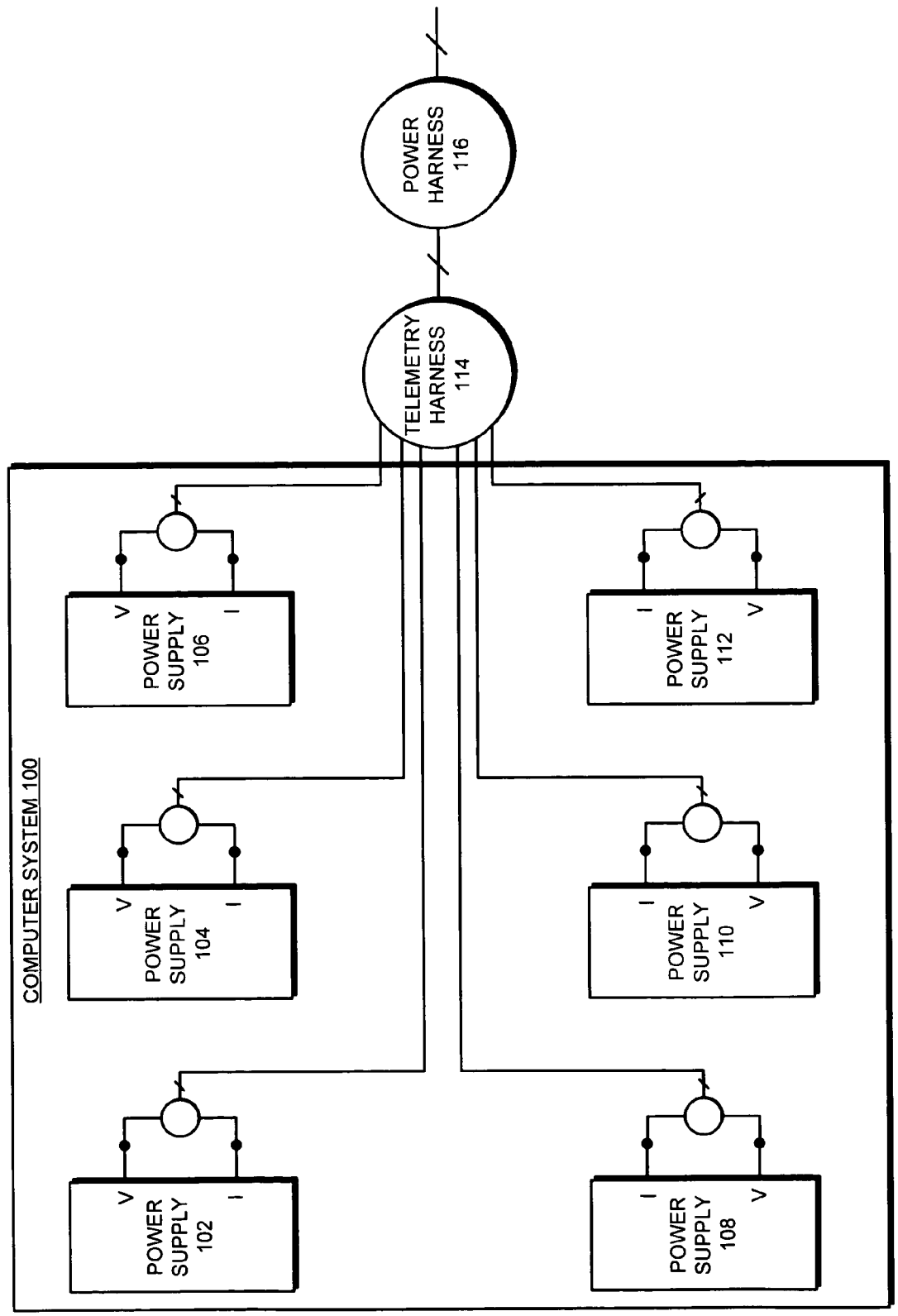
FIG. 1 presents a block diagram of a computer system with a power harness in accordance with an embodiment of the present invention.

FIG. 1 presents a block diagram of computer system 100 with power harness 116 in accordance with an embodiment of the present invention. It also contains sub-components 102, 104, 106, 108, 110, and 112, and telemetry harness 114.

In one embodiment of the present invention, power harness 116 is a software-based tool that reads time-domain traces of the sensor variables from the telemetry harness and computes the total power consumption based on the time-domain traces of the sensor variables. In a variation on this embodiment, the software-based tool is integrated into the computer system as a software patch.

In one embodiment of the present invention, the sub-components are power supplies within the computer system. In another embodiment of the present invention, the sub-components are field-replaceable units within the computer system.

Telemetry harness 114 connects to the sensor outputs in sub-components 102, 104, 106, 108, 110, and 112. Through these connections, telemetry harness 114 polls and aggregates the sensor variables for these sub-components. In one embodiment of the present invention, telemetry harness 114 measures a voltage and an associated current from sensors in each sub-component within the computer system. Note that the sub-components can report other variables, such as temperature. Also note that the telemetry harness measures sensor variables simultaneously from each sub-component within the computer system.

Presently, computer systems use the sensors within each computer system components in interrupt mode. While operating in interrupt mode, the computer system only receives a value of a sensor variable if the value exceeds a high-threshold value or a low-threshold value, and thereby causes an interrupt to occur.

Presently, computer systems use these sensors to protect the sub-components within the computer system from being damaged. For example, if the temperature in a sub-component exceeds a high-temperature threshold value, the computer system shuts off the sub-component before the sub-component is damaged or does damage to the rest of the computer system.

In contrast, the present invention periodically polls sensors to create a dynamic trace of the sensor variables. In doing so, the system creates a time-domain trace of the sensor variables for each sub-component and uses the time-domain trace to calculate total power consumption for the computer system as a function of time.

Computing Power Consumption

Figure 2:
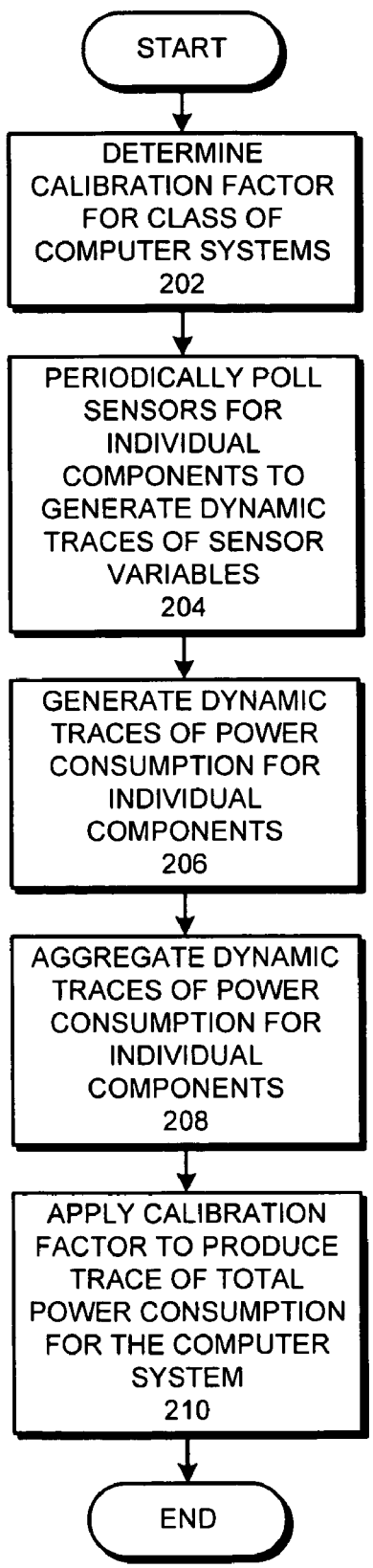
FIG. 2 presents a flow chart illustrating process of computing power consumption in a computer system in accordance with an embodiment of the present invention.

FIG. 2 presents a flow chart illustrating the process of computing power consumption in a computer system in accordance with an embodiment of the present invention. The process begins when the system determines the calibration factor for a given class of computer system (step 202). In doing so, the system calibrates an estimated power consumption computed from dynamic traces of currents and associated voltages with a power consumption directly measured using a hardware power monitor, which accurately measures the power consumption of the computer system.

Note that the system uses the calibration factor to compensate for inaccuracies in the power consumption calculation resulting from biases in the low-accuracy sensors used in the computer system. (Note that system can also use individual calibration factors for each sensor to compensate for these biases in the sensors.)

Also note that the calibration factor for the given class of computer system only needs to be determined once. Since a computer system in a given class of computer systems is typically similar to other computer systems within the given class, the calibration factor for the given class can be applied to any computer system within that given class without having to use a hardware power monitor to recalibrate the sensors.

Next, the system periodically polls sensors for individual components to generate dynamic traces of the sensor variables (step 204). Note that the sensor variables include currents and associated voltages. The system then generates dynamic traces of power consumption for individual components (step 206). It does this by multiplying currents and associated voltages for the individual components within the computer system to produce dynamic traces of power consumption. The system then aggregates the dynamic traces of power consumption for the individual components to produce the dynamic trace for total power consumption in the computer system (step 208). Next, the system applies the calibration factor to the aggregated dynamic trace to produce a dynamic trace of total power consumption for the computer system (step 210).

In one embodiment of the present invention, the system uses historical sensor data to generate a trace of historical power consumption for the computer system.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating a dynamic trace of power consumption for a computer system, comprising:
   periodically polling current sensors and associated voltage sensors within the computer system to generate dynamic traces of currents and associated voltages for individual components within the computer system; and
   generating a dynamic trace of total power consumption for the computer system based on the dynamic traces of the currents and associated voltages by:
      multiplying currents and associated voltages for the individual components within the computer system to produce dynamic traces of power consumption for the individual components; and aggregating the dynamic traces of power consumption for the individual components to produce a dynamic trace of total power consumption for the computer system.

2. The method of claim 1, wherein aggregating the dynamic traces additionally involves applying a calibration factor to the aggregated dynamic trace to produce a dynamic trace of total power consumption for the computer system.

3. The method of claim 2, wherein for a given class of computer systems, the calibration factor is determined once by calibrating an estimated power consumption computed from dynamic traces of currents and associated voltages with a power consumption directly measured using an external hardware power monitor; and wherein after the calibration factor is determined for a given class of computer systems, the calibration factor can be applied to any computer system which belongs to the given class without having to determine the calibration factor again.

4. The method of claim 1, wherein the individual components are power supplies within the computer system.

5. The method of claim 1, wherein the current sensors and the associated voltage sensors are polled through a telemetry harness which measures sensor variables throughout the computer system.

6. The method of claim 1, further comprising using historical sensor data to generate a trace of historical power consumption for the computer system.

7. An apparatus for generating a dynamic trace of power consumption for a computer system, comprising:

a computer system;
a telemetry harness; and
a power harness;
wherein the telemetry harness is configured to:
periodically poll current sensors and associated voltage sensors within the computer system to generate dynamic traces of currents and associated voltages for individual components within the computer system; and
wherein the power harness is configured to:
generate a dynamic trace of total power consumption for the computer system based on the dynamic traces of the currents and the associated voltages, wherein while generating the dynamic trace the power harness is configured to:
multiply currents and associated voltages for the individual components within the computer system to produce dynamic traces of power consumption for the individual components; and to
aggregate the dynamic traces of power consumption for the individual components to produce a dynamic trace of total power consumption for the computer system.

8. The apparatus of claim 7, wherein while aggregating the dynamic traces, the power harness is configured to apply a calibration factor to the aggregated dynamic trace to produce a dynamic trace of total power consumption for the computer system.

9. The apparatus of claim 8, wherein for a given class of computer systems, the calibration factor is determined once by calibrating an estimated power consumption computed from dynamic traces of currents and associated voltages with a power consumption directly measured using an external hardware power monitor; and wherein after the calibration factor is determined for a given class of computer systems, the calibration factor can be applied to any computer system which belongs to the given class.

10. The apparatus of claim 7, wherein the individual components are power supplies within the computer system.

11. The apparatus of claim 7, wherein the current sensors and the associated voltage sensors are polled through the telemetry harness which measures sensor variables throughout the computer system.

12. The apparatus of claim 7, wherein the power harness is configured to use historical sensor data to generate a trace of historical power consumption for the computer system.

13. A computer system that generates a dynamic trace of power consumption, comprising:

a computer system;
a telemetry harness; and
a power harness;
wherein the telemetry harness is configured to:
periodically poll current sensors and associated voltage sensors within the computer system to generate dynamic traces of currents and associated voltages for individual components within the computer system; and
wherein the power harness is configured to:
generate a dynamic trace of total power consumption for the computer system based on the dynamic traces of the currents and the associated voltages, wherein while generating the dynamic trace, the power harness is configured to:
multiply currents and associated voltages for the individual components within the computer system to produce dynamic traces of power consumption for the individual components; and to
aggregate the dynamic traces of power consumption for the individual components to produce a dynamic trace of total power consumption for the computer system.

14. The computer system of claim 13, wherein while aggregating the dynamic traces, the power harness is configured to apply a calibration factor to the aggregated dynamic trace to produce a dynamic trace of total power consumption for the computer system.

15. The computer system of claim 14, wherein for a given class of computer systems, the calibration factor is determined once by calibrating an estimated power consumption computed from dynamic traces of currents and associated voltages with a power consumption directly measured using an external hardware power monitor; and wherein after the calibration factor is determined for a given class of computer systems, the calibration factor can be applied to any computer system which belongs to the given class.

16. The computer system of claim 13, wherein the individual components are power supplies within the computer system.

17. The computer system of claim 13, wherein the current sensors and the associated voltage sensors are polled through the telemetry harness which measures sensor variables throughout the computer system.

18. The computer system of claim 13, wherein the power harness is configured to use historical sensor data to generate a trace of historical power consumption for the computer system.

* * * * *